(12) United States Patent
Kulkarni et al.

(10) Patent No.: US 11,340,928 B2
(45) Date of Patent: May 24, 2022

(54) SYSTEM AND METHOD FOR EFFICIENT ENTITY TRANSITION

(71) Applicant: EMC IP Holding Company LLC, Hopkinton, MA (US)

(72) Inventors: Mahipat Rao Kulkarni, Bangalore (IN); Gururaj Kulkarni, Bangalore (IN); Preeti Sharma, Haryana (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 476 days.

(21) Appl. No.: 16/394,525

(22) Filed: Apr. 25, 2019

(65) Prior Publication Data

US 2020/0341788 A1 Oct. 29, 2020

(51) Int. Cl.
*G06F 9/455* (2018.01)
*G06F 11/14* (2006.01)

(52) U.S. Cl.
CPC ...... *G06F 9/45558* (2013.01); *G06F 11/1461* (2013.01); *G06F 2009/4557* (2013.01); *G06F 2009/45583* (2013.01); *G06F 2201/815* (2013.01)

(58) Field of Classification Search
CPC .................. G06F 9/45558; G06F 11/1461
See application file for complete search history.

(56) References Cited

U.S. PATENT DOCUMENTS

| 2013/0311991 A1* | 11/2013 | Li | H04L 61/2015 |
| | | | 718/1 |
| 2016/0105321 A1* | 4/2016 | Thakkar | H04L 41/0813 |
| | | | 709/220 |
| 2018/0285203 A1* | 10/2018 | Cox | G06F 11/1464 |
| 2020/0192802 A1* | 6/2020 | Ng | H04L 67/2823 |

* cited by examiner

*Primary Examiner* — Tammy E Lee
(74) *Attorney, Agent, or Firm* — Chamberlain, Hrdlicka, White, Williams & Aughtry (57) ABSTRACT

The method includes performing virtual machine (VM) discovery on a transitioned VM to obtain secondary information, classifying, using a tag mapping, the transitioned VM using at least the secondary information to identify a tag, associating the transitioned VM with a backup policy based on the tag, and sending the backup policy and the tag to a production host hosting the transitioned VM.

17 Claims, 8 Drawing Sheets

SYSTEM AND METHOD FOR EFFICIENT ENTITY TRANSITION

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, in one aspect, the invention relates to a method for managing virtual machines. The method includes performing virtual machine (VM) discovery on a transitioned VM to obtain secondary information, classifying, using a tag mapping, the transitioned VM using at least the secondary information to identify a tag, associating the transitioned VM with a backup policy based on the tag, and sending the backup policy and the tag to a production host hosting the transitioned VM.

In one aspect, a non-transitory computer readable medium in accordance with one or more embodiments of the invention includes computer readable program code, which when executed by a computer processor enables the computer processor to perform a method for managing virtual machines. The method includes performing virtual machine (VM) discovery on a transitioned VM to obtain secondary information, classifying, using a tag mapping, the transitioned VM using at least the secondary information to identify a tag, associating the transitioned VM with a backup policy based on the tag, and sending the backup policy and the tag to a production host hosting the transitioned VM.

In one aspect, a system in accordance with one or more embodiments of the invention includes a processor, a tag mapping, and a transitioned entity manager programmed to perform a method for managing virtual machines. The method includes performing virtual machine (VM) discovery on a transitioned VM to obtain secondary information, classifying, using the tag mapping, the transitioned VM using at least the secondary information to identify a tag, associating the transitioned VM with a backup policy based on the tag, and sending the backup policy and the tag to a production host hosting the transitioned VM.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing a backup operation. More specifically, embodiments of the invention relate to a system and method for managing the backup policies implemented on a transitioned virtual machine (VM). The transitioned VM may be transitioned from one production host to a second production host. A VM manager executing on the second production host may send a notification to a transitioned entity manager of the transitioned VM.

Embodiments of the invention may include obtaining configuration information and/or secondary information from the transitioned VM and classifying the transitioned VM based on the configuration information and/or the secondary information to identify a tag. Embodiments of the invention may include identifying a set of backup policies to implement on the transitioned VM based on the tag. The VM manager may implement the backup policies on the transitioned VM.

Figure 1:
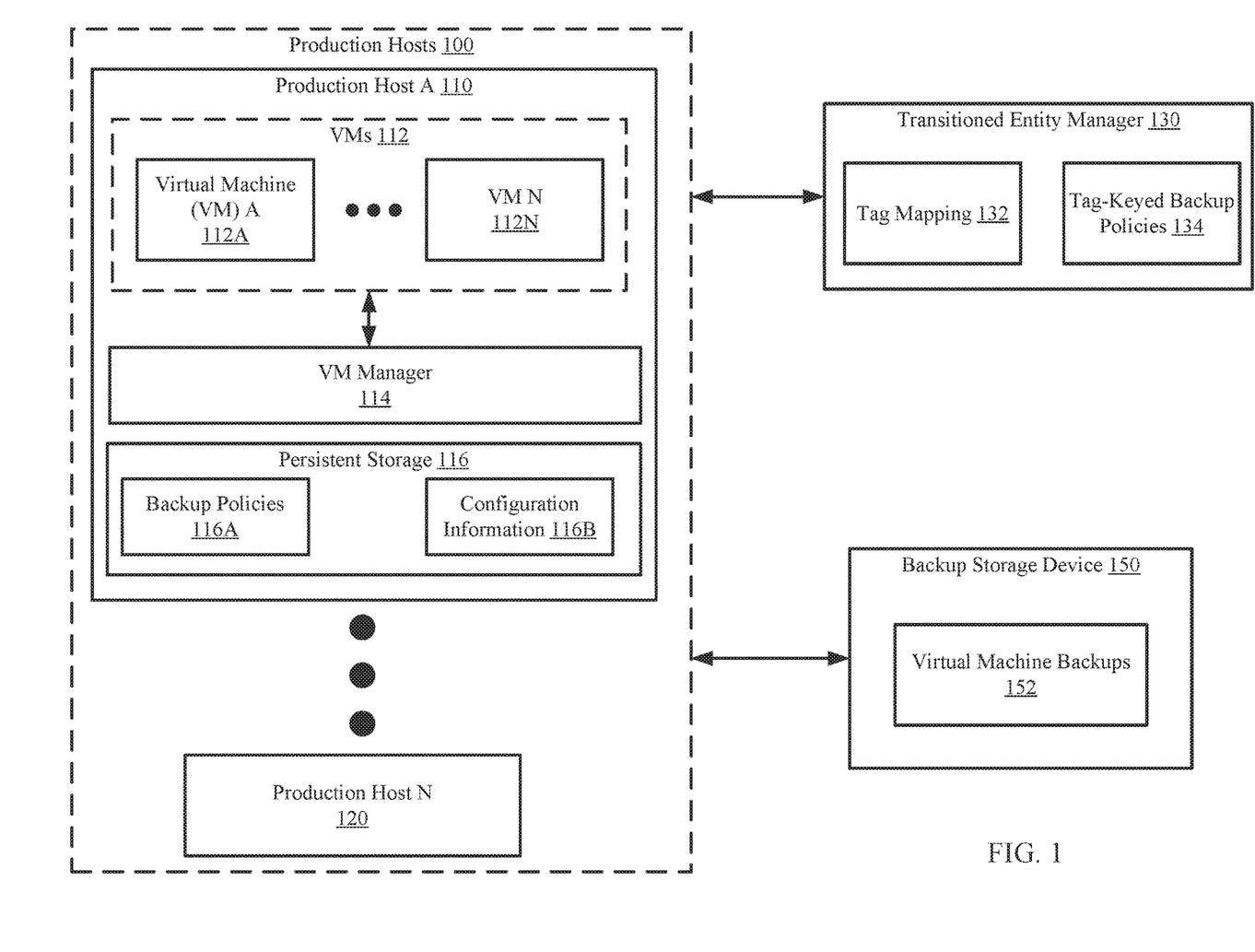
FIG. 1 shows a diagram of a system in accordance with one or more embodiments of the invention.

FIG. 1 shows a diagram of a system in accordance with one or more embodiments of the invention. The system includes production hosts (100), a transitioned entity tagger (130), and a backup storage device (150). The system may include additional, fewer, and/or different components without departing from the invention. Each component may be operably connected via any combination of wired and/or wireless connections. Each component illustrated in FIG. 1 is discussed below.

In one or more embodiments of the invention, a production host (e.g., 110, 120) is a device that hosts virtual machines (VMs) (112). The production hosts (100) include functionality that allows the virtual machines (112) to utilize computing resources of the production hosts (1120) to perform the functionalities of the virtual machines (112) discussed below. A production host (110, 120) may further include a VM manager (114) that manages the virtual machines (112) and persistent storage (116) that stores data relevant to the VM manager (114) and the virtual machines (112).

Figure 5:
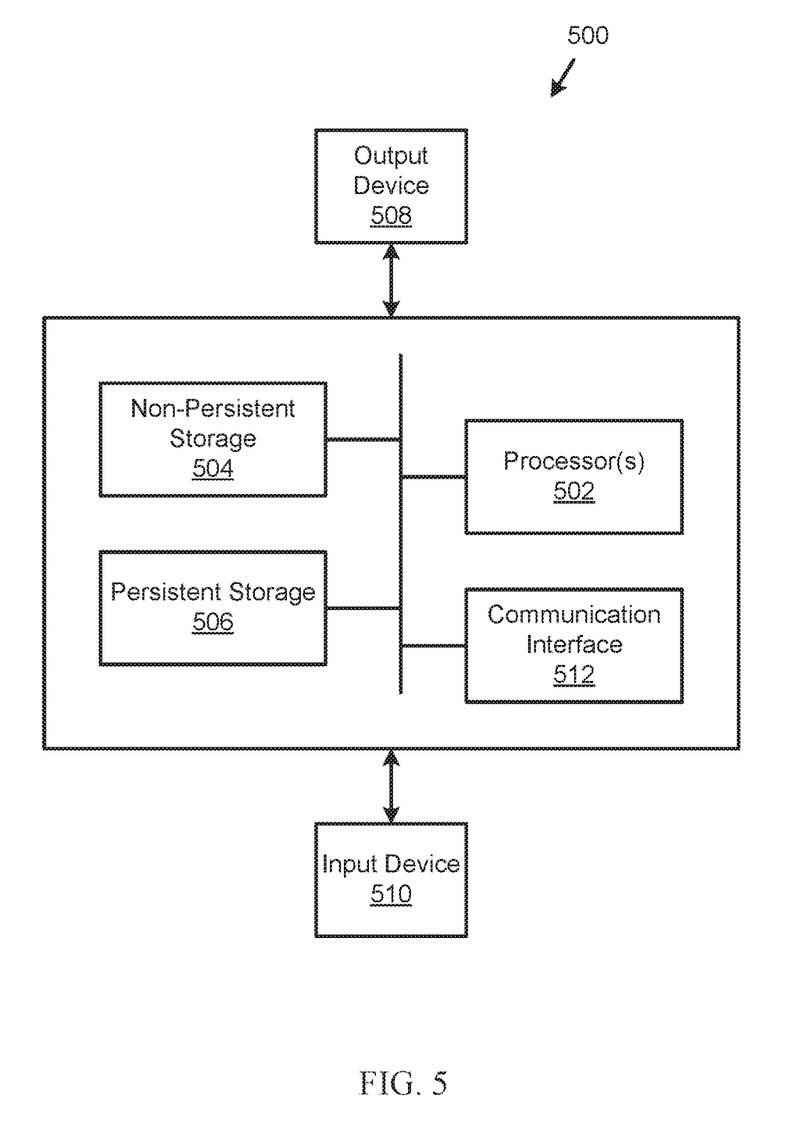
FIG. 5 shows a diagram of a computing device in accordance with one or more embodiments of the invention.

In one or more embodiments of the invention, one or more production hosts (110, 120) are implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (110, 120) described throughout this application and/or all, or a portion thereof, of the method illustrated in FIG. 3.

In one or more embodiments of the invention, one or more production hosts (110, 120) are implemented as a logical device. The logical device may utilize the computing resources of any number of computing devices and thereby provide the functionality of the production host (110, 120) described throughout this application and/or all, or a portion thereof, of the method illustrated in FIG. 3.

In one or more embodiments of the invention, the virtual machines (112) are logical entities executed using computing resources (not shown) of the production host (110, 120). Each of the virtual machines (112A 112N) may be performing similar or different processes. In one or more embodiments of the invention, the virtual machines (112) provide services to users, e.g., clients (not shown). For example, the virtual machines (112) may host instances of databases, email servers, and/or other applications. The virtual machines (112) may host other types of applications without departing from the invention. In one or more embodiments of the invention, the virtual machines (112) issue backup storage requests to store data in a backup storage device (150).

In one or more of embodiments of the invention, the virtual machines (112) are implemented as computer instructions, e.g., computer code, stored on a persistent storage (e.g., on the production host (110, 120)) that when executed by a processor(s) of the production host (110, 120) cause the production host (110, 120) to provide the functionality of the virtual machines (112) described throughout this application.

In one or more embodiments of the invention, the VM manager (114) manages the virtual machines (112). The VM manager (114) manages the virtual machines by implementing backup policies (116A) that specify when and how a backup of each virtual machine (112A, 112N) is to be generated and stored in the backup storage device (152). The VM manager (114) may initiate a backup of the virtual machines (112A, 112N) in accordance with the backup policies (116A).

In one or more embodiments of the invention, a virtual machine may be transitioned from one production host (e.g., 120) to another (e.g., 110) and becomes a transitioned VM. In one or more embodiments of the invention, a transitioned VM is a virtual machine that was at one point in time was hosted by one production host (120), utilizing the computing resources of the first production host (120), but is hosted instead by a second production host (110), utilizing the computing resources of the second production host (110). In one or more embodiments of the invention, the VM manager (114) may not utilize the backup policies (116A) of the production host (110) to back up the transitioned VM. However, the transitioned VM may be tagged by a transitioned entity manager (130) with a tag that may be used to identify backup policies to implement on the transitioned VM. The method of tagging the transitioned VM may be illustrated in FIG. 3. The transitioned VM may be tagged via other methods without departing from the invention.

In one or more embodiments of the invention, the VM manager (114) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the VM manager (114) described throughout this application and/or all, or a portion thereof, of the method illustrated in FIG. 3.

Figure 3:
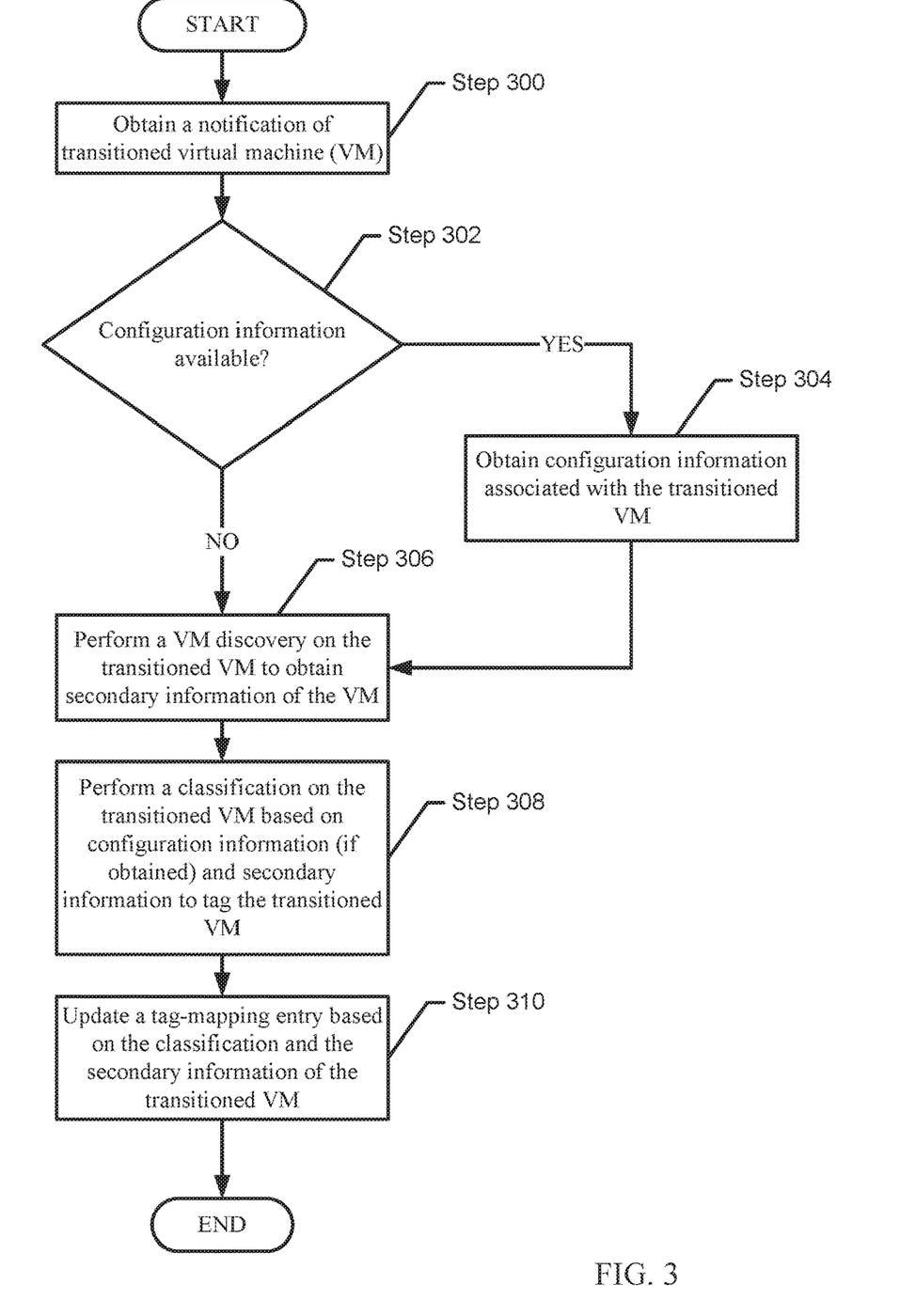
FIG. 3 shows a flowchart for managing virtual machines in accordance with one or more embodiments of the invention.

In one or more of embodiments of the invention, the VM manager (114) is implemented as computer instructions, e.g., computer code, stored on a persistent storage that when executed by a processor of the production host (110, 120) cause the production host (110, 120) to provide the functionality of the VM manager (114) described throughout the application and/or all, or a portion thereof, of the method illustrated in FIG. 3.

In one or more embodiments of the invention, the backup policies (116A) are data structures, stored in persistent storage (116), that specify how and when to back up the virtual machines (112) hosted by the production host (110, 120). The backup policies (116A) may include entries each specifying a virtual machine and a schedule for when to back up the virtual machine (e.g., every day, every 7 days, every hour, etc.).

In one or more embodiments of the invention, the configuration information (116B) is a data structure, stored in persistent storage (116), that specifies the configuration settings of each virtual machine. The configuration information (116B) may include network settings, user-defined configurations, and/or other information without departing from the invention.

In one or more embodiments of the invention, the network settings of a VM (112A, 112N) specify information used by the VM manager (414) for how to incorporate the VM (112A, 112N) in to a network. The network settings of a VM (112A, 112N) may further specify network connections between the VM (112A, 112N) and other nodes in the network.

In one or more embodiments of the invention, user-defined configurations of a VM (112A, 112N) are configurations of the VM defined by a user operating a client (not shown). The user may define information such as, for example, usernames/passwords used to access data of the VM (112A, 112N) and/or levels of access of the data for each client. The user-defined information may be other types of information defined by a user without departing from the invention.

In one or more embodiments of the invention, the configuration information is stored in an open virtualization format (OVF). The OVF may be a file and/or data format used by a VM manager (114) to store configuration of a given VM and to communicate this information to other VM manager (114), e.g., when the VM is transitioned to from the VM manager to another VM manager. An open virtualization application (OVA) file formatted in OVF may include the information used by the VM manager to configure the transitioned VM to be hosted by the production host (e.g., 110). An OVA file may include an OVF descriptor that specifies the configuration information of any number of VMs (112A, 112N). The descriptor may be stored, for example, as an Extensible Markup Language (XML) data file. The OVF descriptor may include, for example, the network settings of the VMs (112A, 112N), user-defined configuration information of the VMs (112A, 112N), requirements for a production host to be able to host the VMs (112A, 112N), and/or other configuration information associated with the VMs (112A, 112N) without departing from the invention.

In one or more embodiments of the invention, if a virtual machine (e.g., 112A) is transitioned from a production host (110) to a second production host (120), configuration information (or at least a portion thereof) of the transitioned virtual machine (112A) is transitioned as well. In other embodiments of the invention, the configuration information of the virtual machine (112A) is not transitioned with the virtual machine (112A).

In one or more embodiments of the invention, the transitioned entity manager (130) is a device that manages transitioned VMs. The transition entity manager (130) may manage the transitioned VMs by analyzing the transitioned VMs to classify the transitioned VMs and using the classifications to tag the transitioned VMs. To perform the aforementioned functionality, the transitioned entity manager may include a tag mapping (132) and tag-keyed backup policies (134).

In one or more embodiments of the invention, the transitioned entity manager (130) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the transitioned entity manager (130) described throughout this application and/or all, or a portion thereof, of the method illustrated in FIG. 3.

In one or more embodiments of the invention, the transitioned entity manager (130) is implemented as a logical device. The logical device may utilize the computing resources of any number of computing devices and thereby provide the functionality of the transitioned entity manager (130) described throughout this application and/or all, or a portion thereof, of the method illustrated in FIG. 3.

In one or more embodiments of the invention, the tag mapping (132) is a data structure that specifies tags to apply to a transitioned VM as well as a mapping of the tag to VM information elements. The transitioned entity manager (130) may use the tag mapping (132) for determining a tag to apply to the transitioned VM. For additional details regarding the tag mapping, see, e.g., FIG. 2.

In one or more embodiments of the invention, the tag-keyed backup policies (134) stored in a data structure and associate each tag specified in the tag mapping (132) to a set of backup policies. The transitioned entity manager (130) may use the tag-keyed backup policies (134) to identify a set of backup policies to implement on a transitioned VM after the transitioned VM has been tagged. The tag-keyed backup policies (134) may include entries. Each entry may include a tag and an associated backup policy. To implement a backup policy on a transitioned VM, the transitioned entity manager (130) may identify the tag of the transitioned VM, identify an entry in the tag-keyed backup policies (134) associated with the identified tag, and implement the corresponding backup policy of the identified entry.

In one or more embodiments of the invention, the backup storage device (150) is a device that stores backups. The backups (152) may be virtual machine backups (152). The backup storage device (150) may store other data without departing from the invention. In one or more embodiments of the invention, the virtual machine backups (152) include backups of one or more virtual machines (112). A backup may be a data structure that may be used to recover a virtual machine to a previous point in time. The backup may include data of the virtual machine, encrypted data of the virtual machine, metadata that references the data of the virtual machine, and/or other data associated with the virtual machine without departing from the invention.

In one or more embodiments of the invention, the backup storage device (150) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage device (150) described throughout this application.

In one or more embodiments of the invention, the backup storage device (150) is implemented as a logical device. The logical device may utilize the computing resources of any number of computing devices and thereby provide the functionality of the backup storage device (150) described throughout this application.

Figure 2:
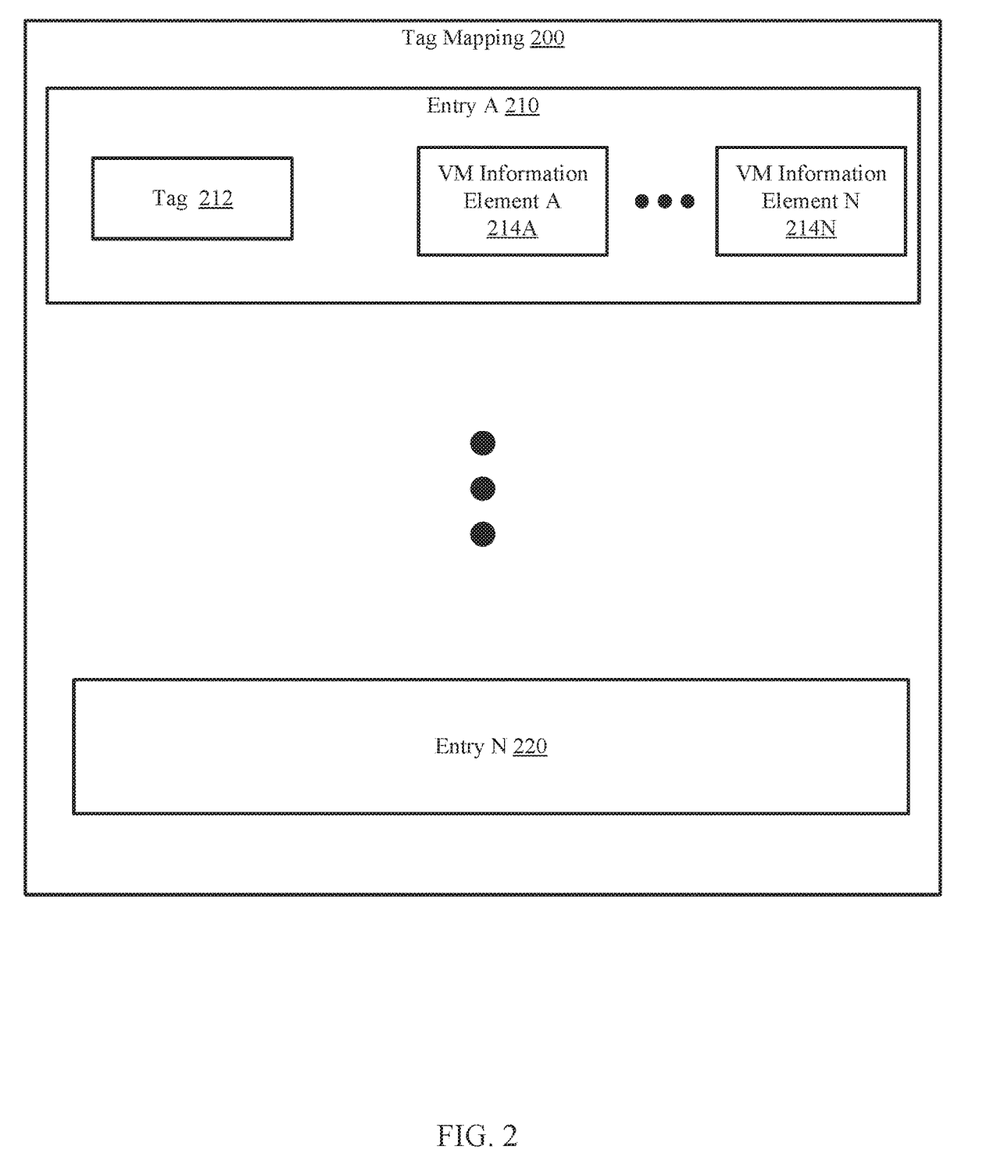
FIG. 2 shows a diagram of a tag mapping in accordance with one or more embodiments of the invention.

FIG. 2 shows a diagram of a tap mapping in accordance with one or more embodiments of the invention. The tag mapping (200) may include any number of entries (210, 220). Each entry may include a tag (212) and one or more VM information elements (214A, 214N). The entries of the tag mapping (200) may include additional, fewer, and/or different portions without departing from the invention.

In one or more embodiments of the invention, the tag (212) of an entry is a portion of data that may be added to a virtual machine to be used to identify backup policies to implement on the virtual machine. The tag (212) may be, for example, a series of characters (i.e., a string value).

In one or more embodiments of the invention, the VM information elements (214A, 214N) are portions of data that each specify a characteristic associated with the corresponding tag (212). The VM information element may specify a characteristic of a virtual machine. The characteristic may be, for example, a portion of configuration information implemented by a virtual machine. Additionally, the characteristic may be a type of data stored by a virtual machine. Examples of types of data stored by a virtual machine may include "email server," "operating system X," "application Y," and/or other types of data without departing from the invention.

For example, an entry (e.g., 210) of the tag mapping (200) may include a tag labeled "Tag 1". VM information elements associated with the tag may include: "Operating System A," "Application B," and "database VM." A transitioned entity manager using the tag mapping (200) to classify a virtual machine may identify VM information elements of the VM and look through the tag mapping to find an entry that most closely matches the identified VM information elements. The transitioned entity manager may identify operating system A used by the VM and identify that the VM is a database VM. The transitioned entity manager may tag the transitioned VM with "Tag 1" after determining that the VM information elements associated with "Tag 1" most closely resemble the identified VM information elements of the transitioned VM.

In one or more embodiments of the invention, an entry (210, 220) includes an "unknown" tag. In one or more embodiments of the invention, the "unknown" tag is a tag that a transitioned entity manager may apply to a transitioned VM if the transitioned entity manager is unable to match the transitioned VM to another tag using the VM information elements of the transitioned VM. In other words, the "unknown" tag is a miscellaneous tag that may be applied to transitioned VMs that have not been further classified into any other tag.

FIG. 3 shows a flowchart for performing a backup operation in accordance with one or more embodiments of the invention. The method shown in FIG. 3 may be performed by, for example, a transitioned entity manager (130, FIG. 1). Other components of the system illustrated in FIG. 1 may perform the method of FIG. 3 without departing from the invention.

Turning to FIG. 3, in step 300, a notification of a transitioned VM is obtained. In one or more embodiments of the invention, the notification is obtained from a production host obtaining the transitioned VM. The notification may include a request to identify backup policies to implement on the transitioned VM.

In step 302, a determination is made about whether configuration information associated with the transitioned VM is available. If configuration information VM is available, the method proceeds to step 304; otherwise, the method proceeds to step 306. In one or more embodiments of the invention, a transitioned VM that does not have associated configuration information available may be initially tagged with the "unknown" tag. Further classification of the transitioned VM may, or may not, update the tag on the transitioned VM.

In step 304, configuration information associated with the transitioned VM is obtained. In one or more embodiments of the invention, the configuration information is obtained from the production host obtaining the transitioned VM. The configuration information (e.g., in the form of an OVF file) may be initially obtained by the production host during the transition of the VM from a first production host. The configuration information associated with the VM may be divided into VM information elements. The VM information elements may be, for example, properties stored in the OVF format.

In step 306, a VM discovery is performed on the transitioned VM to obtain secondary information of the VM. The VM discovery may include using one or more application programming interfaces (APIs) of the transitioned entity manager that communicates with portions of the transitioned VM to obtain the secondary information. The transitioned entity manager, via the APIs, may send a request to the transitioned VM to obtain the secondary information.

In one or more embodiments of the invention, the secondary information is a series of VM information elements obtained by the transitioned entity manager that is in addition to any configuration information obtained (if any) in Step 304. The secondary information may specify VM information elements of the VM such as, for example, an operating system executing on the transitioned VM, an application executing on the VM, and/or other VM information elements. In one or more embodiments of the invention, there secondary information (i.e., information obtained by the transitioned entity manager via APIs) may overlap with configuration information obtained in step 304.

In step 308, a classification is performed on the transitioned VM based on configuration information (if obtained) and secondary information to tag the transitioned VM. In one or more embodiments of the invention, the classification is performed in two parts. The first part of the classification performed uses the obtained configuration information of the VM. The transitioned entity manager may compare the configuration information of the transitioned VM to VM information elements of a tag mapping, stored in the transitioned entity manager, to identify a tag that is associated with a group of VM information elements that most closely match the configuration information of the transitioned VM. The transitioned entity manager may read the VM information elements of each entry to determine the entry that includes the most VM information elements that may be associated with the transitioned VM.

The second part of the classification may be performed on transitioned VMs for which configuration information was not obtained (as determined in step 302). The second part of the classification may include using the secondary information to further classify the transitioned VM. The transitioned entity manager may read VM information elements of each entry of the tag mapping to determine the entry that includes the most VM information elements that may be associated with the secondary information obtained from the transitioned VM. The transitioned VM may be tagged with an identified tag of the entry.

In one or more embodiments of the invention, a transitioned VM with no configuration information available is initially tagged with an "unknown" tag prior to the classification. The "unknown" tag of the transitioned VM, after the second part of the classification, may be replaced with the identified tag. In this manner, a more tailored backup policy is implemented on the transitioned VM.

In one or more embodiments of the invention, a transitioned VM initially tagged with an "unknown" tag may remain tagged with an "unknown" tag after the classification if the secondary information does not include sufficient information for the transitioned entity manager to further classify the transitioned VM to a different tag.

The tag that is ultimately determined in Step 308 (which may be an "unknown" tag) is provided to the production host by the transitioned entity manager. Further, a backup policy associated with the tag is sent to the production host hosting the transitioned VM. The transitioned entity tagger may identify the backup policy using tag-keyed backup policies stored in the transitioned entity tagger. In the tag-keyed backup policies, the backup policy is associated with the tag sent to the production host.

In one or more embodiments of the invention, the production host hosting the transitioned VMs may update backup policies stored on the production host based on the obtained tag and backup policy. The production host may update the backup policies by including an entry that associates the tag with the obtained backup policy. In this manner, the production host may use the entry when initiating a backup of the transitioned VM.

In step 310, an entry of the tag mapping is updated based on the classification and the secondary information of the transitioned VM. In one or more embodiments of the invention, the entry associated with the tag applied to the transitioned VM is updated by adding VM information elements based on the secondary information of the transitioned VM. In other words, the updated entry includes one or more additional VM information elements that were not included prior to updating the entry. The VM information elements added to the entry may be similar to VM information elements obtained from the configuration information and/or the secondary information. By dynamically updating the entries in the tag mapping after the classification enables the tag mapping to be improved without requiring the user to manually add additional VM information elements to the tag mapping. In this manner, the more the tag mapping is used the more detailed the tag mapping becomes (i.e., there are more VM information elements associated with the tags), which leads to a better classification of the transitioned VMs with the appropriate tag.

After the transitioned VM has been tagged, the VM may be backed up in accordance with the backup policy associated with the tag. Accordingly, at some point in time after the tagging of the transitioned VM is completed, the production host may initiate a backup of the transitioned VM using the tag in combination with the updated backup policies stored on the host.

Example

Figure 4A:
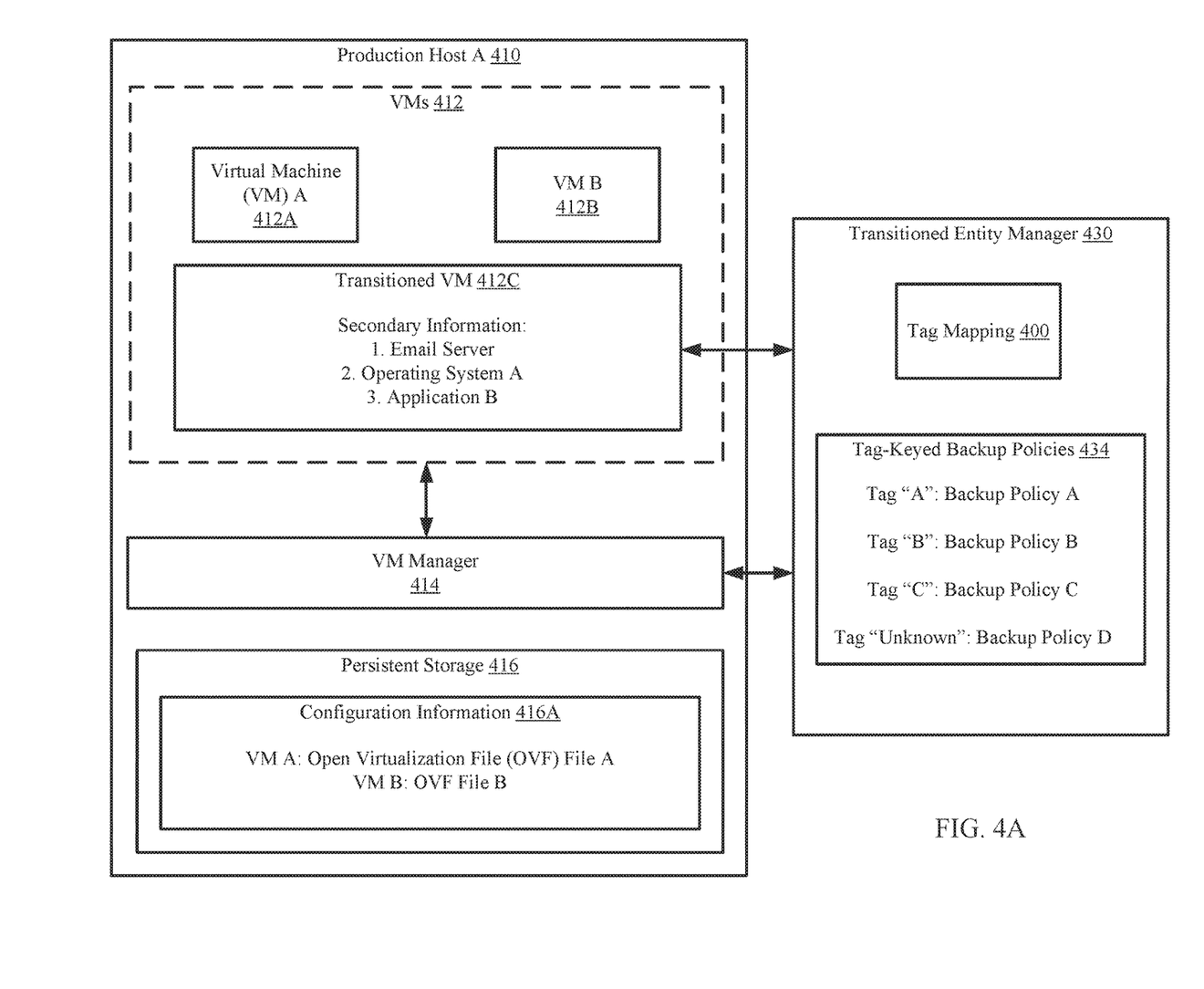
FIGS. 4A-4D show an example in accordance with one or more embodiments of the invention.

The following section describes an example. The example, illustrated in FIGS. 4A-4D, is not intended to limit the invention. Turning to the example, consider a scenario in which a VM has been transitioned to a production host. FIG. 4A shows a diagram of an example system. The example system includes the production host (410) and a transitioned entity manager (430). The production includes the transitioned VM (412C), two additional VMs (412A, 412B), a VM manager (414), and persistent storage (416) storing configuration information (416A). The transitioned VM (430) may include a tag mapping (400) and tag-keyed backup policies (434).

The production host (410), upon receiving the transitioned VM (412C), notifies the transitioned entity manager (430) of the transitioned VM (412C). The transitioned entity manager (430) performs the method illustrated in FIG. 3 to tag the transitioned VM (412C). Specifically, the transitioned entity manager (430) determines whether configuration information for the transitioned VM is available. The transitioned entity manager (430) may be notified by the VM manager (414) that the configuration information (416A) stored by the production host (410) does not include any configuration information for the transitioned VM (412C). Based on the notification, the transitioned entity manager (430) obtains secondary information from the transitioned VM (412C). The secondary information may include VM information elements that describe the transitioned VM (412C). The VM information elements may specify: (i) the transitioned VM (412C) is operating as an email server, (ii) the transitioned VM (412C) is executing on operating system A, and (iii) the transitioned VM (412C) is executing application B. The transitioned entity manager (430) may use the VM information elements of the secondary information to perform a classification on the transitioned VM (4112C). The classification may include comparing the VM information elements of the secondary information to VM information elements specified in the tag mapping (400)

Figure 4B:
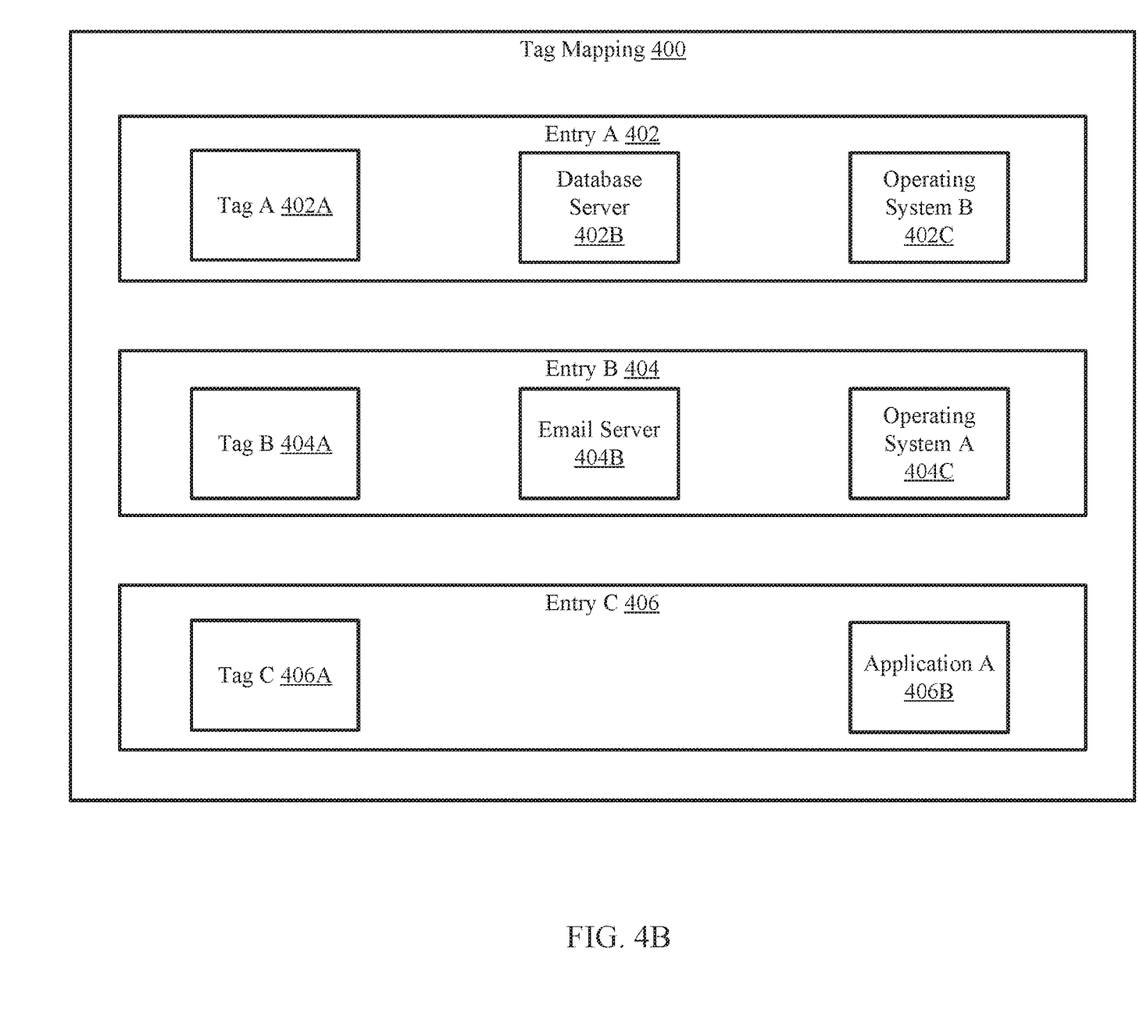

FIG. 4B shows a diagram of the tag mapping used by a transitioned entity manager. The tag mapping (400) includes three entries (402, 404, 406). Each entry has a tag (402A, 404A, 404A) and any number of VM information elements (402B, 402C, 404B, 404C, 406B). The transitioned entity manager may compare the obtained secondary information (i.e., email server, operating system A, and application B) to determine a tag to apply to the transitioned VM. The tag mapping may include an entry B (404) in which the VM information elements of the entry (404) match two of the VM information elements of the secondary information. Entry B (404) is associated with a tag B (404A), and the VM information elements "Email Server" (404B) and "Operating System A" (404C). Based on the matching to entry B (404), the transitioned VM identify the tag B (404A) associated with entry B (404).

Figure 4C:
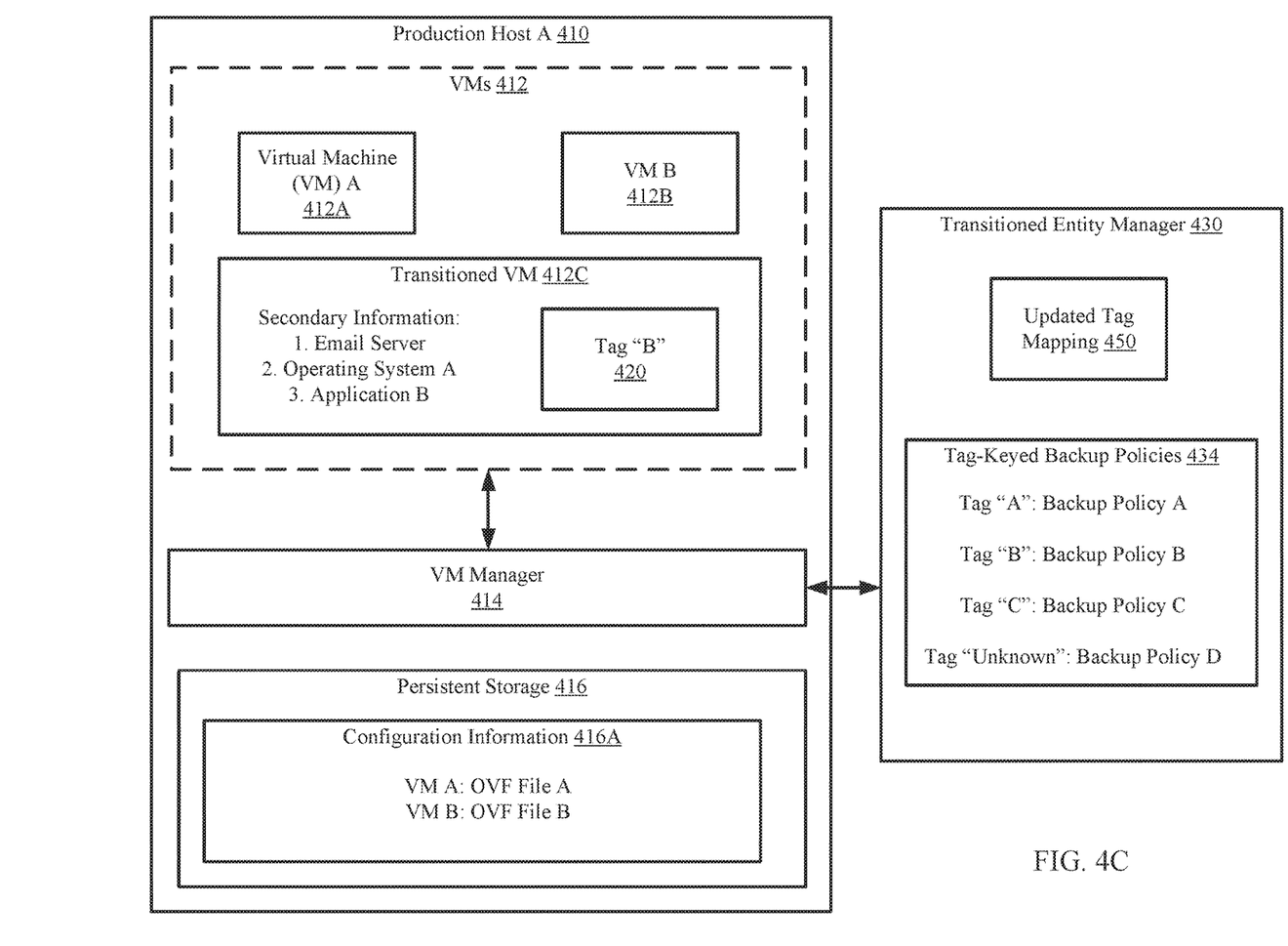

FIG. 4C shows a diagram of the example system at a second point in time. The second point in time may be after the classification performed by the transitioned entity manager (430). The transitioned entity manager (430), based on the classification, tags the transitioned VM (412C) with tag "B" (420). The transitioned entity manager (430) may tag the transitioned VM (412C) by sending the tag labeled "B" to the transitioned VM (412C) to be stored in the metadata of the transitioned VM (412C). Further, the transitioned entity manager (412C) may identify a backup policy to be implemented by the VM manager (414) when performing backups of the transitioned VM (412C). Using the tag-keyed backup policies (434), the transitioned entity manager (430) identifies backup policy B to be implemented on the transitioned VM (412C). The transitioned entity manager (430) may send the identified backup policy to the VM manager (414). The VM manager (414) may use the backup policy to update backup policies (not shown) stored in persistent storage (416) of the production host (410). The VM manager (414) may associate the backup policy with the tag "B" (420) when updating the backup policies of the production host (410). In this manner, the VM manager (414) may implement backup policy B on the transitioned VM (412C) when backing up the VMs (412).

In addition to tagging the transitioned VM (412C), the transitioned entity manager (430) updates the tag mapping (450). The updates to the updated mapping (400) are illustrated in FIG. 4D.

Figure 4D:
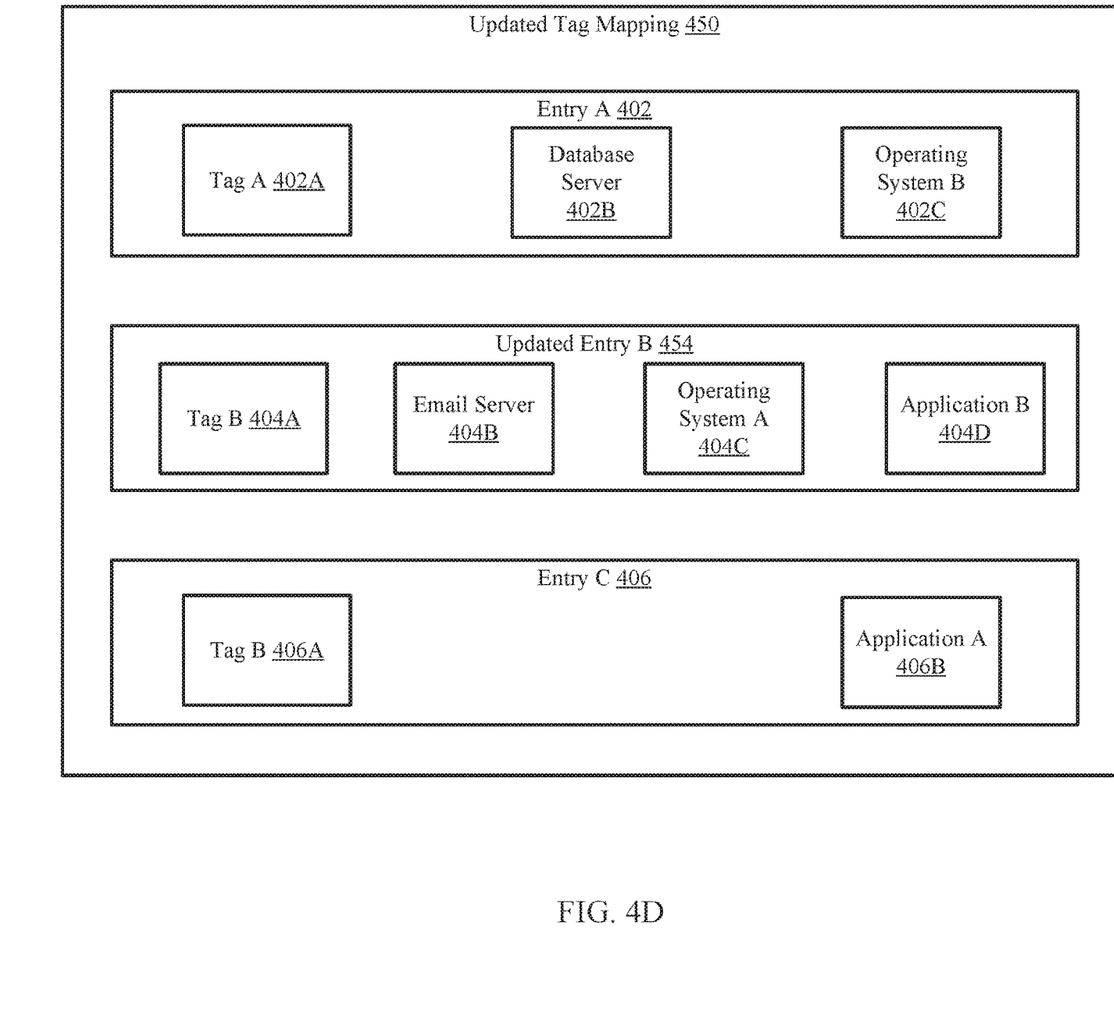

FIG. 4D shows a diagram of the updated tag mapping (450). The updated tag mapping (450) includes an updated entry B (454) that specifies an additional VM information element (404D) based on the secondary information of the transitioned VM. The VM information element "Application B" is added to the updated entry (454) so that if a different VM is transitioned in a future time period, the future transitioned VM may be tagged in a similar way to the transitioned VM (412C, FIG. 3C) discussed above should the two transitioned VMs share similar secondary information.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the environment in which a virtual machine (VM) manager managing virtual machines executing on a first production host implements backup policies on a VM transitioned from a second production host. In the current VM environment, the VM manager may not have the capability to identify backup policies to implement on the transitioned VM if the information is not readily available to the VM manager.

Embodiments of the invention includes using a transitioned entity manager, operating within or without the production host, obtaining information from the transitioned VM, such as, for example, configuration information and/or secondary information, and classifying the transitioned VM to apply a tag that is associated with a set of backup policies most tailored to the transitioned VM.

Embodiments of the invention may apply a default tag (e.g., "unknown") to the transitioned VM if the obtained information is not sufficient to further classify the transitioned VM. The default tag may be associated with a default set of backup policies. In this manner, backup protection is provided to the transitioned VM despite not being classified using obtained information.

Thus, embodiments of the invention may address the problem of inefficient use of computing resources. This problem arises due to the technological nature of the environment in which backup policies are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing virtual machines, the method comprising:
performing virtual machine (VM) discovery on a transitioned VM to obtain secondary information, wherein the transitioned VM is transitioned from a first production host to a second production host;
classifying, using a tag mapping, the transitioned VM using at least the secondary information to identify a tag;
associating the transitioned VM with a backup policy based on the tag;
sending the backup policy and the tag to the second production host hosting the transitioned VM;
after the classifying, updating an entry in the tag mapping associated with the tag using the secondary information, wherein updating the entry comprises adding VM information elements specified in the secondary information to the entry to obtain an updated entry; and
classifying, using the updated entry, a second transitioned VM using the updated entry of the tag mapping.

2. The method of claim 1, further comprising:
receiving a notification that identifies the transitioned VM, wherein the VM discovery is performed in response to the notification.

3. The method of claim 1, wherein performing the VM discovery comprises:
sending a request to the transitioned VM via an application programming interface (API) provided by the transitioned VM;
receiving the secondary information in response to the request.

4. The method of claim 3, wherein the secondary information comprises information about an operating system executing on the transitioned VM.

5. The method of claim 4, wherein the secondary information further comprises information about at least one application executing on the transitioned VM.

6. The method of claim 1, wherein classifying the transitioned VM further comprises using configuration information associated with the transitioned VM.

7. The method of claim 1, wherein prior to updating the entry, a VM information element of the plurality of VM information elements matches a second VM information element in at least one selected from a group consisting of the configuration information and the secondary information.

8. The method of claim 7, wherein after the updating the entry comprises at the least one of the VM information element that was not present in the entry prior to the updating.

9. The method of claim 6, wherein the configuration information comprises at least one selected from a group consisting of network settings and user-defined configuration information.

10. The method of claim 6, wherein the confirmation information is specified in an open virtualization format (OVF) descriptor for the transitioned VM.

11. The method of claim 1, further comprising:
updating, after the classifying, an entry in the tag mapping associated with the tag using the secondary information.

12. A non-transitory computer readable medium comprising computer readable program code, which when executed by a computer processor enables the computer processor to perform a method for performing a backup operation, the method comprising:
performing virtual machine (VM) discovery on a transitioned VM to obtain secondary information, wherein the transitioned VM is transitioned from a first production host to a second production host;
classifying, using a tag mapping, the transitioned VM using at least the secondary information to identify a tag;
associating the transitioned VM with a backup policy based on the tag; and
sending the backup policy and the tag to a production host hosting the transitioned VM;
after the classifying, updating an entry in the tag mapping associated with the tag using the secondary information, wherein updating the entry comprises adding VM information elements specified in the secondary information to the entry to obtain an updated entry; and
classifying, using the updated entry a second transitioned VM using the updated entry of the tag mapping.

13. The non-transitory computer readable medium of claim 12, wherein the method further comprises:
receiving a notification that identifies the transitioned VM, wherein the VM discovery is performed in response to the notification.

14. The non-transitory computer readable medium of claim 12, wherein performing the VM discovery comprises:
sending a request to the transitioned VM via an application programming interface (API) provided by the transitioned VM;
receiving the secondary information in response to the request.

15. The non-transitory computer readable medium of claim 12, wherein prior to updating the entry, a VM information element of the plurality of VM information elements matches a second VM information element in at least one selected from a group consisting of the configuration information and the secondary information.

16. The non-transitory computer readable medium of claim 15, wherein after the updating the entry comprises at the least one of the VM information element that was not present in the entry prior to the updating.

17. A system, comprising:
a processor;
a tag mapping;
a transitioned entity manager programmed to:
perform virtual machine (VM) discovery on a transitioned VM to obtain secondary information, wherein the transitioned VM is transitioned from a first production host to a second production host;
classify, using the tag mapping, the transitioned VM using at least the secondary information to identify a tag;
associate the transitioned VM with a backup policy based on the tag; and
send the backup policy and the tag to a production host hosting the transitioned VM;
after the classifying, updating an entry in the tag mapping associated with the tag using the secondary information, wherein updating the entry comprises adding VM information elements specified in the secondary information to the entry to obtain an updated entry; and
classifying, using the updated entry, a second transitioned VM using the updated entry of the tag mapping.

* * * * *